US007962519B2

(12) United States Patent
Kibler et al.

(10) Patent No.: US 7,962,519 B2
(45) Date of Patent: Jun. 14, 2011

(54) METHOD, SYSTEM, AND PROGRAM PRODUCT FOR BUILDING HIERARCHIES

(75) Inventors: Clare T. Kibler, Binghamton, NY (US); Jason M. Blackwell, Vestal, NY (US); Robert A. Morgan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 11/834,266

(22) Filed: Aug. 6, 2007

(65) Prior Publication Data

US 2009/0043810 A1    Feb. 12, 2009

(51) Int. Cl.
*G06F 17/30* (2006.01)
(52) U.S. Cl. ........................................................ 707/790
(58) Field of Classification Search .................. None
See application file for complete search history.

(56) References Cited

U.S. PATENT DOCUMENTS

| 5,761,511 A | 6/1998 | Gibbons et al. |
| 5,875,446 A | 2/1999 | Brown et al. |
| 6,499,036 B1 | 12/2002 | Gurevich |
| 7,111,016 B2 | 9/2006 | Gurevich |
| 2002/0167538 A1* | 11/2002 | Bhetanabhotla .............. 345/700 |
| 2008/0256055 A1* | 10/2008 | Cloward ........................... 707/5 |

OTHER PUBLICATIONS

Hannan Samet, "Object-Based and Image-Based Object Representations", ACM Computing Surveys, vol. 36, No. 2, Jun. 2004, pp. 159-217.
Venugopal et al., "A Taxonomy of Data Grids for Distributed Data Sharing, Management, and Processing", ACM Computing Surveys, vol. 38, Mar. 2006, Article 3, pp. 1-53.

* cited by examiner

*Primary Examiner* — Don Wong
*Assistant Examiner* — Belinda Xue
(74) *Attorney, Agent, or Firm* — William Schiesser; Hoffman Warnick LLC (57) ABSTRACT

In general, the present invention allows one to define both a hierarchy with one or more peers and no parents (e.g., one or more blades and no chassis) and a hierarchy with one or more peers and a parent (e.g., one or more blades and a chassis) as long as the relationships are valid. Rather than relying on a user's a priori knowledge of the hierarchical relationships, this invention allows a user to select any starting point and then drive in any desired direction. Despite this flexibility, the invention still allows rules for permissible relationships to be enforced. Thus, driving is limited by the relationships extant in the underlying data, or the known combining rules.

13 Claims, 7 Drawing Sheets

| Build your own model – HS20 BladeCenter | | | |
|---|---|---|---|
| Model | Operating System | Processor | Memory |
| HS20 Server 8843AC1<br>→ Customize | Operating System A | Xeon EM64T<br>2.8 GHz/800 MHz | 2x256MB |
| HS20 Server 8843MC1<br>→ Customize | Operating System B | Xeon EM64T<br>2.8 GHz/800 MHz | 2x256MB |

Total slots 14, Filled slots 3, Free slots 11. 2 (1234) McData 10-port 4Gb Fibre Channel Switch Module for IBM eServer BladeCenter. (3456) BladeCenter 2000W Power Supplies one and two Customize | Add rack | Add blade | Delete

— 60B

HS20 8843MC1

$1344.00

(1234) 3.0 GHz 400 MHz 4MB L3 Cache Upgrade with Xeon MP, 3 (4567) 3.0GHz 4MB L3 Cache Xeon MP, Memory 12GB current/16GB max, 2 slots Add storage | Add blade | Delete

FIG. 7

# METHOD, SYSTEM, AND PROGRAM PRODUCT FOR BUILDING HIERARCHIES

FIELD OF THE INVENTION

The present invention generally relates to the building of hierarchies. Specifically, the present invention allows a hierarchy to be built based on a user-selected starting point and known compatibilities and/or business rules.

BACKGROUND OF THE INVENTION

Many on-line applications rely on data that is hierarchically organized, for example, street address look-ups, genealogy applications, company management directories, university course catalogs, and hardware configurators. Sometimes, user tasks in these applications are aimed at identifying a single instance or node, as in a directory lookup. Other times users are attempting to create permissible subsets of the data governed by the hierarchical relationships of the underlying data. This is the case with a hardware configurator. Users are trying to define a system that contains one or more components whose relationships are governed by the underlying hierarchy. They select a basic system, and then pick a processor from the set of available processors, storage compatible with the processor, a rack that the system fits in, etc. There may be other racks and storage that are not compatible and hence cannot be combined in this subset/system.

Existing hardware configurators have not adequately solved the problem of allowing users to define a system elegantly. One approach for instance, addresses the task by constraining the starting points and by constraining the size of hierarchical "chunks" (i.e., product "parents, peers and children") based on the selected item. This has the effect of constraining the solution set in ways that may not be desired. For instance, parents may be added automatically when not desired, forcing a user to include a chassis (parent) and a server when only a server was desired. This particular approach does not portray all objects in the emerging configuration. In addition, because this approach does not drive the hierarchy from a focus object, it does not filter subsequent additions based on a particular focus object. Hence, the approach has a single adding mechanism in its graphical user interface.

In view of the foregoing, there exists a need for a solution that solves at least one of the deficiencies of the related art.

SUMMARY OF THE INVENTION

In general, the present invention allows one to define both a hierarchy with one or more peers and no parents (e.g., one or more blades and no chassis) and a hierarchy with one or more peers and a parent (e.g., one or more blades and a chassis) as long as the relationships are valid. This invention allows a user to select any starting point and then drive in any desired direction. To contrast this with traditional approaches, consider an application that records a family tree. A traditional approach might be to require the user to start with their oldest known ancestor, and work down (e.g., children can only be added after their immediate parents have been added). This invention allows a user to start with themselves (or anywhere else in their family they choose), and drive so as to define their brothers and sisters, parents, aunts, uncles, spouse, children, and the like. Despite this flexibility, the invention still allows rules for permissible relationships to be enforced. Thus, driving is limited by the relationships extant in the underlying data, or the known combining rules. For example, when defining a family tree, driving may be restricted by limiting parents of any particular node to two.

Using this approach in a hardware configurator, allows the "driving directions" to be limited by compatibility with what has been included thus far. For example, if a user starts with a BladeCenter server (BladeCenter is a trademark of IBM Corp. in the United States and/or other countries), they can add other blade servers (peers) or a chassis (parent) but not a rack mounted server (unrelated). Because the hierarchy is driven one node at a time, items available for inclusion in any particular hierarchy instance can be filtered based on the hierarchy defined so far, the node in focus, and the known relationship rules of the larger underlying system. In a family of peers, if only some can coexist in any given hierarchical instance, then once a particular item is identified, the other choices are narrowed. In this way, once a server is defined and becomes the node in focus, the servers that are available as peers are filtered based on compatibility with focus server. Similarly, once a server is identified, the storage devices can be filtered by compatibility.

A first aspect of the present invention provides a method for building hierarchies, comprising: receiving a selection of a focus object; loading the focus object into a builder from a catalog of objects; revealing a set of objects as possible hierarchical extensions to the focus object based on relationships of the set of objects to the focus objects; receiving a selection of one of the set of objects; identifying a set of instances corresponding to the selected object; and filtering the set of objects for compatibility with the focus object using hierarchical relationships as defined in the catalog of objects.

A second aspect of the present invention provides a system for building hierarchies, comprising: a module for receiving a selection of a focus object; a module loading the focus object into a builder from a catalog of objects; a module revealing a set of objects as possible hierarchical extensions to the focus object based on relationships of the set of objects to the focus objects; a module receiving a selection of one of the set of objects; a module identifying a set of instances corresponding to the selected object; and a module filtering the set of objects for compatibility with the focus object using hierarchical relationships as defined in the catalog of objects.

A third aspect of the present invention provides a program product stored on a computer readable medium for building hierarchies, the computer readable medium comprising program code for causing a computer system to: receive a selection of a focus object; load the focus object into a builder from a catalog of objects; reveal a set of objects as possible hierarchical extensions to the focus object based on relationships of the set of objects to the focus objects; receive a selection of one of the set of objects; identify a set of instances corresponding to the selected object; and filter the set of objects for compatibility with the focus object using hierarchical relationships as defined in the catalog of objects.

A fourth aspect of the present invention provides a method for deploying a system for building hierarchies, comprising: providing a computer infrastructure being operable to: receive a selection of a focus object; load the focus object into a builder from a catalog of objects; reveal a set of objects as possible hierarchical extensions to the focus object based on relationships of the set of objects to the focus objects; receive a selection of one of the set of objects; identify a set of instances corresponding to the selected object; and filter the set of objects for compatibility with the focus object using hierarchical relationships as defined in the catalog of objects.

A fifth aspect of the present invention provides computer software embodied in a propagated signal for building hierarchies, the computer software comprising instructions for causing a computer system to: receive a selection of a focus object; load the focus object into a builder from a catalog of objects; reveal a set of objects as possible hierarchical extensions to the focus object based on relationships of the set of objects to the focus objects; receive a selection of one of the set of objects; identify a set of instances corresponding to the selected object; and filter the set of objects for compatibility with the focus object using hierarchical relationships as defined in the catalog of objects.

A sixth aspect of the present invention provides a data processing system for building hierarchies, comprising: a memory medium comprising instructions, a bus coupled to the memory medium; and a processor coupled to the bus that when executing the instructions causes the data processing system to: receive a selection of a focus object, load the focus object into a builder from a catalog of objects, reveal a set of objects as possible hierarchical extensions to the focus object based on relationships of the set of objects to the focus objects, receive a selection of one of the set of objects, identify a set of instances corresponding to the selected object, and filter the set of objects for compatibility with the focus object using hierarchical relationships as defined in the catalog of objects.

A seventh aspect of the present invention provides a computer-implemented business method for building hierarchies, comprising: receiving a selection of a focus object; loading the focus object into a builder from a catalog of objects; revealing a set of objects as possible hierarchical extensions to the focus object based on relationships of the set of objects to the focus objects; receiving a selection of one of the set of objects; identifying a set of instances corresponding to the selected object; and filtering the set of objects for compatibility with the focus object using hierarchical relationships as defined in the catalog of objects.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention will have the following sections:

I. General Description
II. Computerized Implementation

I. General Description

As indicated above, the present invention allows one to define both a hierarchy with one or more peers and no parents (e.g., one or more blades and no chassis) and a hierarchy with one or more peers and a parent (e.g., one or more blades and a chassis) as long as the relationships are valid.

This invention allows a user to select any starting point and then drive in any desired direction. To contrast this with traditional approaches, consider an application that records a family tree. A traditional approach might be to require the user to start with their oldest known ancestor, and work down (e.g., children can only be added after their immediate parents have been added). This invention allows a user start with themselves (or anywhere else in their family they choose), and drive to define their brothers and sisters, parents, aunts, uncles, spouse, children, and the like. Despite this flexibility, the invention still allows rules for permissible relationships to be enforced. Thus, driving is limited by the relationships extant in the underlying data, or the known combining rules. For example, when defining a family tree, driving may be restricted by limiting parents of any particular node to two.

Using this approach in a hardware configurator, allows the "driving directions" to be limited by compatibility with what has been included thus far. For example, if a user starts with a BladeCenter server, they can add other blade servers (peers) or a chassis (parent) but not a rack mounted server (unrelated). Because the hierarchy is driven one node at a time, items available for inclusion in any particular hierarchy instance can be filtered based on the hierarchy defined so far, the node in focus, and the known relationship rules of the larger underlying system. In a family of peers, if only some can coexist in any given hierarchical instance, then once a particular item is identified, the other choices are narrowed. In this way, once a server is defined and becomes the node in focus, the servers that are available as peers are filtered based on compatibility with focus server. Similarly, once a server is identified, the storage devices can be filtered by compatibility.

Figure 1:
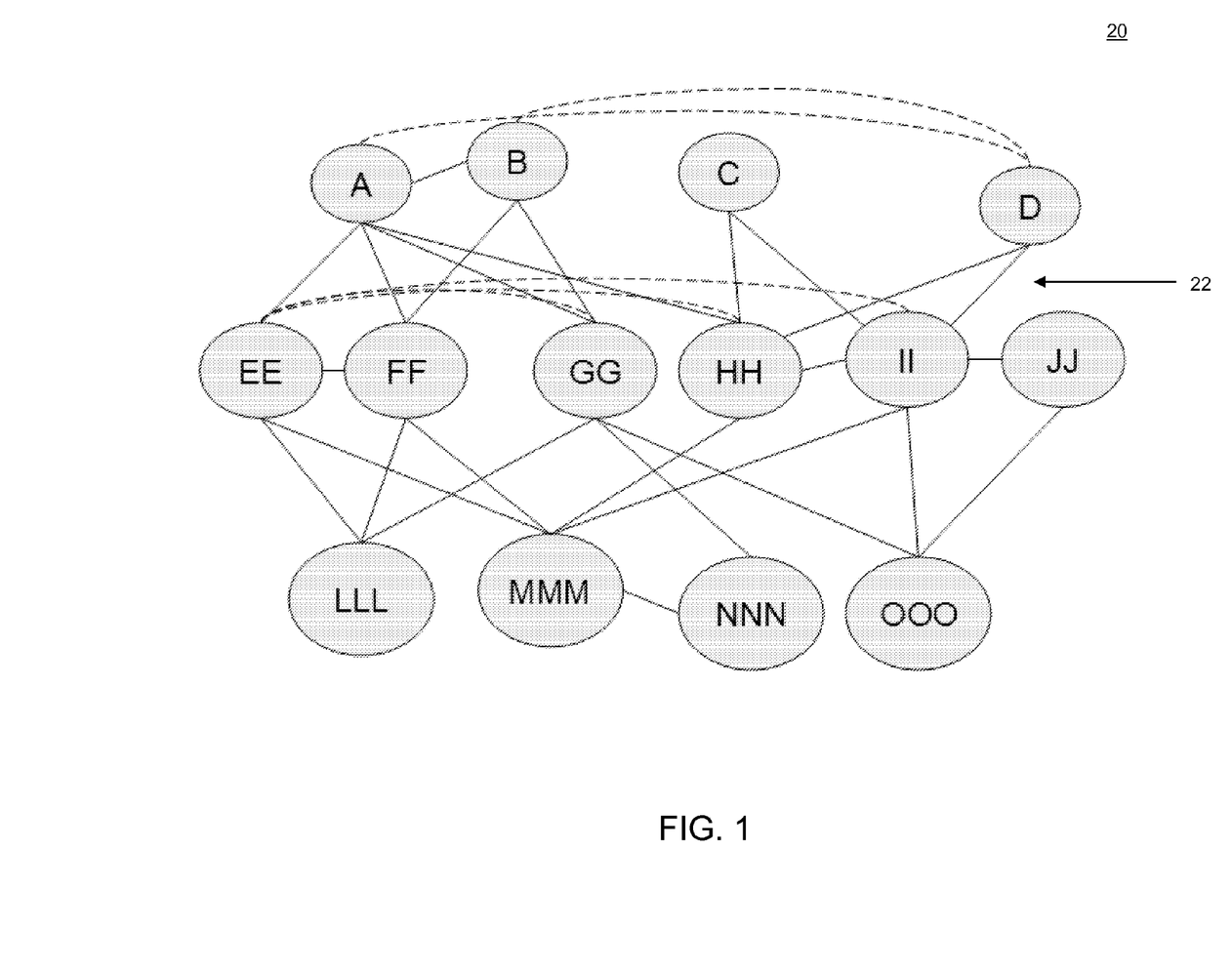
FIG. 1 depicts an illustrative hierarchy of underlying objects according to the present invention.

This invention is a method for defining a hierarchy based on an underlying set of hierarchical data. The underlying data may be organized in a simple tree structure, or in a complex fashion where peer nodes have asymmetrical relationships with each other. To demonstrate how the invention could be used for any number of complex hierarchical relationships, consider an arbitrary set of data whose objects are related as shown in hierarchical object map 20 of FIG. 1. In FIG. 1, objects 22 connected with lines (both dotted and solid) are related and may be combined together. Objects 22 that are not connected are not related and cannot coexist in any subset of data. Connected objects 22 with different numbers of letters in their names are in parent-child relationships. Those with the same numbers of letters are peers. While an arbitrary example, FIG. 1 does illustrate the sort of complex relationships one might see in such applications as hardware configurators, as illustrated by the scenarios below.

In general, this invention allows a user to construct a number of subset hierarchies based on the underlying object relationships, without foreknowledge of them. The user identifies a starting or focus object and then drives to the next object(s). The invention constrains additions and ensures permissible hierarchies are constructed, by making available for addition, only objects for which relationships exist. The invention constrains additions based on all the objects defined so far. To understand how this might work, imagine a focus function that highlights a single object in FIG. 1 above. The following scenarios illustrate how allowable connections are determined and hence surfaced, so the user can add as desired, within the acceptable limits.

Scenario 1: Extend the Hierarchy Up Vertically

When object LLL is in focus, the user can extend the hierarchy to parents EE, FF or GG. No peer extensions are possible because object LLL is not defined to peers (as illustrated by the lack of lines connecting LLL to any objects at the same level). No children extensions are possible for the same reason. This is the situation for a service pack that can be applied to any of a number of servers, for instance (in practice, service packs are not sold separately, but are sold as children of parent products).

Scenario 2: Extend the Hierarchy Down Vertically

When object C is in focus, the user can extend the hierarchy to children HH and II only (again, note connecting lines). No peer extensions and no parent extensions are possible. This is the situation for a rack that can contain servers, but not attach to other racks.

Scenario 3: Extend Hierarchy Up or Down Vertically

When object GG is in focus, the user can extended the hierarchy upwards towards parents A or B, and downwards towards children LLL, NNN, and OOO. It cannot be extended horizontally, and it cannot be extended to parents C or D or children MMM as these objects are not defined as allowable connections to GG. This is the situation for a server that fits into multiple racks, must be used alone, and can take several kinds of storage devices.

Scenario 4: Extend the Hierarchy Vertically or Horizontally

When object II is in focus, a user can extend the hierarchy up vertically to parents C or D, and down vertically to children OOO and MMM. A user can also extend the hierarchy horizontally to peers HH, JJ and EE.

The scenarios thus far have described how a user can create a hierarchy by moving up, down and sideways with reference to a focus object. A critical component of this invention is that although one object is in focus, the objects that are available to extend the hierarchy are further constrained by the entire context that has been defined thus far. The next scenarios provide examples of this concept.

Scenario 5: Restrict Peers Based on Other Peers

When object EE is in focus a user can extend the hierarchy by selecting peers, parents and children. Having made any one of these selections constrains the other subsequent selections. For example, once a user defines a hierarchy as containing EE and FF, GG can no longer be included, because although EE is a peer to both FF and GG, FF and GG are not peers. In a hardware configuration, not all servers can coexist within a single racked system.

Scenario 6: Restrict Peers Based on Children

Again, starting with object EE, a user can define children LLL and MMM. Once the hierarchy contains these three objects however, the peer set for EE is constrained. Peer FF can be added but not peer GG since no relationship is defined between GG and MMM.

Scenario 7: Restrict Parents Based on Peers

Just as selection of children and peers can restrict the set of peers that can subsequently be added, selection of peer sets can restrict the parents that are possible. The table below shows possible parents given various sets of peers that are already in the hierarchy.

Given These Peers: These Parents Could be Added:
EE, FF A
EE, HH A
HH, II C, D
II, JJ none
EE, HH, II none As can be seen, a user can construct a hierarchy based on the focus object, and based on the entire context that has been defined so far. A final constraint in construction is the application of business rules. Just as different objects may or may not be compatible, so business rules may constrain the order objects may be added. For instance, LLL is defined above as a child of EE. Business constraints may allow a user to add LLL from EE, but not add EE from LLL. This is the situation with service packs. A user can add a service pack to a processor, but cannot add a processor to a service pack.

This invention allows a user to define a hierarchy without knowledge of the underlying relationships, by driving through objects that are revealed based on what has been defined so far. To help the user understand their progress it is not necessary to announce the kind of relationships that obtain with items that might be added. For instance it is not necessary to know that a chassis has a parent relationship with a blade, in order to add a chassis to a hierarchy that already has a blade it in. But it is necessary to describe the relationships among the objects once added. That is, for a hardware configurator in any event, it is necessary to show that blades are nested in chassis, that the chassis is the parent of one or more blades. The present invention has a catalog component and a builder component where the repository of available items and the items selected, respectively are shown. This allows the user to indicate driving directions, and shows the hierarchical relationships of items added so far. Further this solution allows one to define both a hierarchy with one or more peers and no parents (e.g., one or more blades and no chassis) and a hierarchy with one or more peers and a parent (e.g., one or more blades and a chassis) as long as the relationships are defined. The mechanics of this solution are described below.

Figure 2:
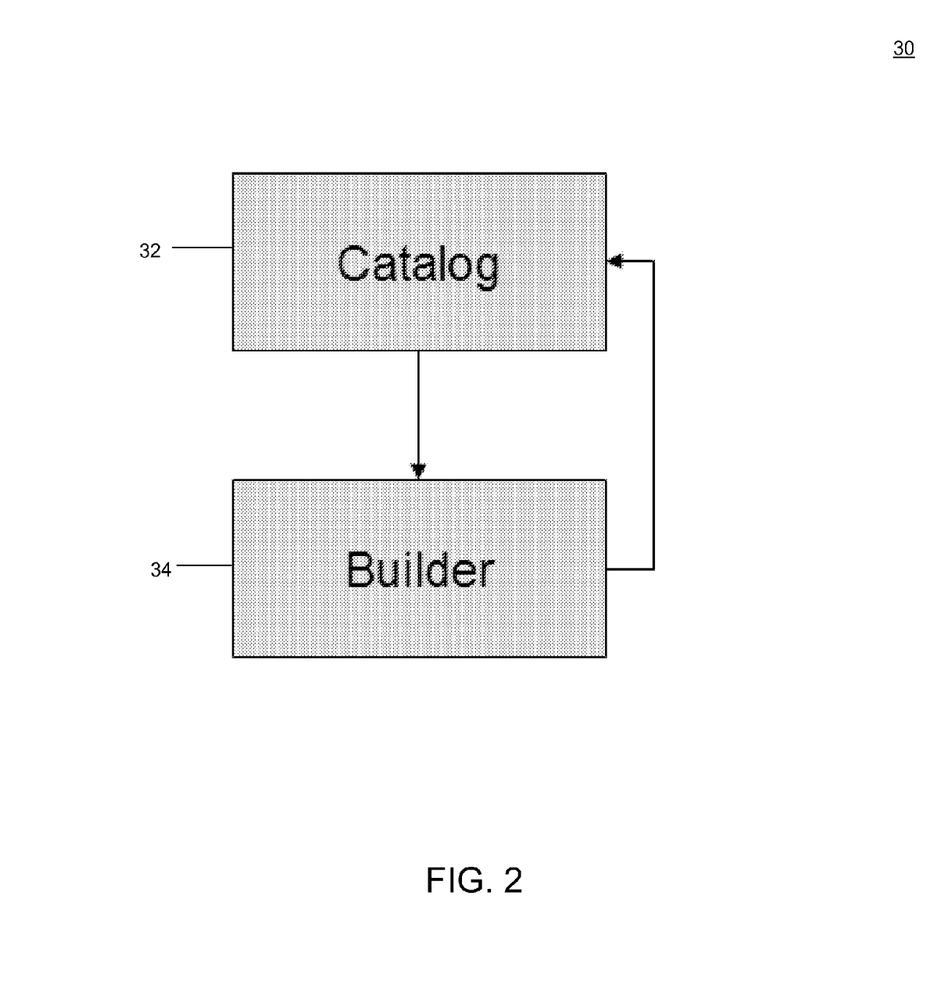
FIG. 2 depicts an illustrative conceptual map of a solution according to the present invention.
Figure 3:
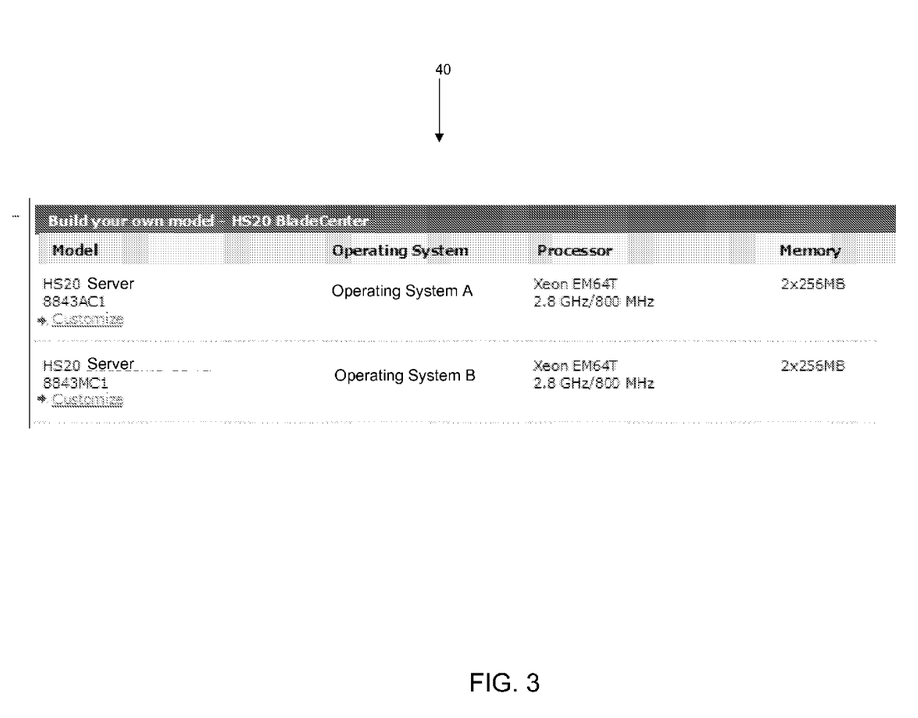
FIG. 3 depicts sample hardware catalog according to the present invention.

In order for a user to define a hierarchy, the present invention accesses and/or provides a repository of objects and their permissible relationships, a repository for the in progress hierarchy, and a process to move between the two. Referring to FIG. 2, a conceptual map 30 of the solution is shown. When a user enters the catalog 32 initially, all possible objects may be available because no context and hence no constraints exist to filter it. It is worth noting that the underlying hierarchy may have a priori constraints on permissible starting objects, and if so, only those objects would appear in the catalog 32. In any event, once the initial object is selected and loaded into the builder 34, subsequent catalog 32 presentations are filtered by the point of focus, and the items in builder 34 thus far. Catalog 32 can be realized as one or more web pages that surfaces appropriate objects to the user. It may require successive selections to refine the selection criteria until the object level is reached. For instance, a user might select hardware and a model from a page that includes a table 40 such as shown in FIG. 3.

Figure 4:
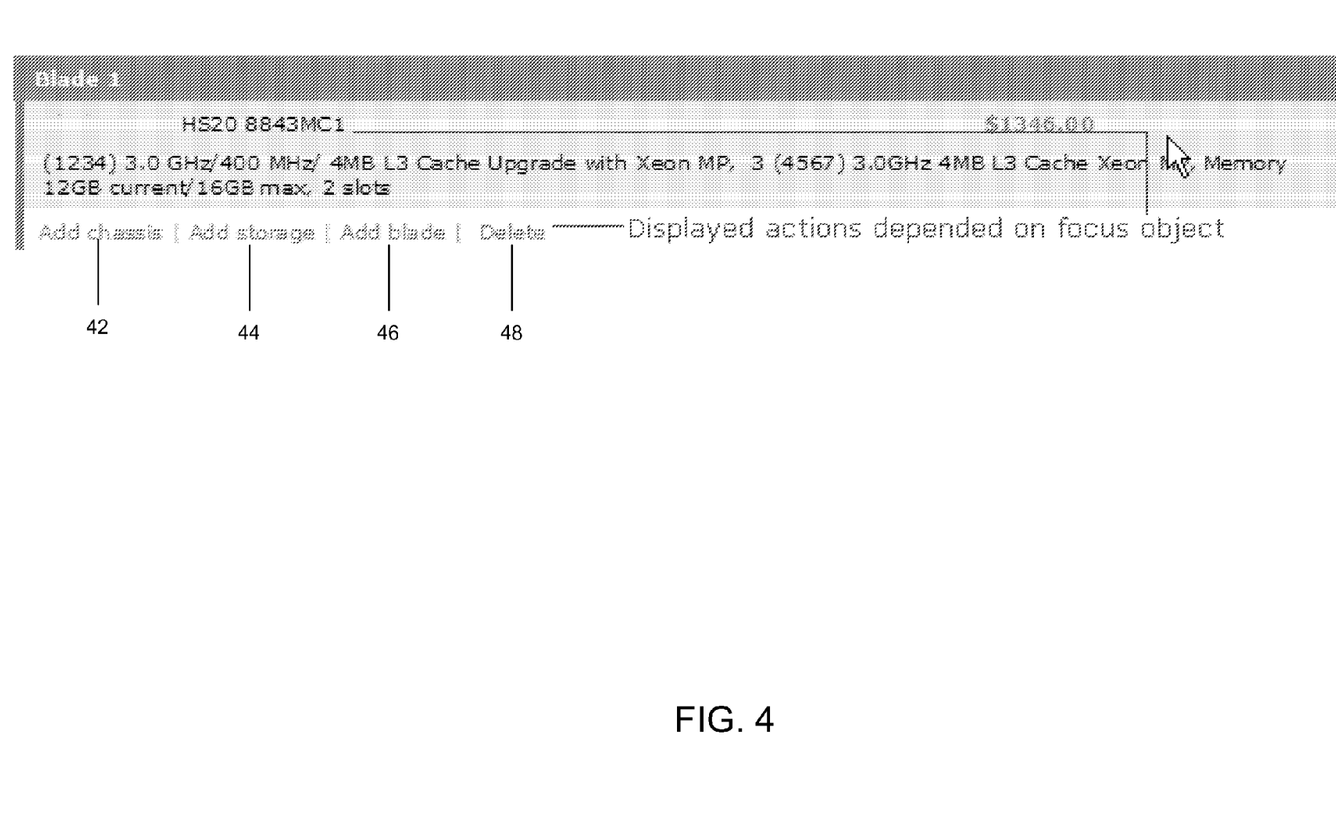
FIG. 4 depicts an illustrative builder containing a single object according to the present invention.

Once the selected object, in this case a BladeCenter server, is loaded into the builder, possible hierarchy extensions are revealed. As FIG. 4 shows, the context established by this blade sever causes the builder to expose function to add a parent chassis 42, peer storage 44, and blades 46, as well as function 48 to delete this object. Note that the kinds of relationships, whether parent, peer or child are not articulated as this is not necessary to driving through the hierarchy creation process. That is, the user need not be aware a priori of the relationships between possible components. These relationships are revealed in time and in context. Nevertheless, the nature of the relationships dictates the arrangement of the available additions. Permissible add actions are presented as parent, peer, and child, from left to right. A focus object can have a single parent, but may have multiple peer and child relationships.

When a user selects an object to add (e.g., add chassis), the catalog function may again require successive selections to refine the selection criteria until the object level is reached. This time however the objects available are constrained by the particular object (this model of blade server). To see how this works, refer to FIG. 5, which shows three very simple partial views 50A-C of another hypothetical hierarchy. When a user selects an object to add from the builder, the invention identifies the items in the hierarchy that are of that type. These are the models in FIG. 5. Then it filters them for compatibility with the focus object and other items already in the hierarchy, and presents a small catalog to allow the user to refine their selection until a single item is selected.

Figure 5:
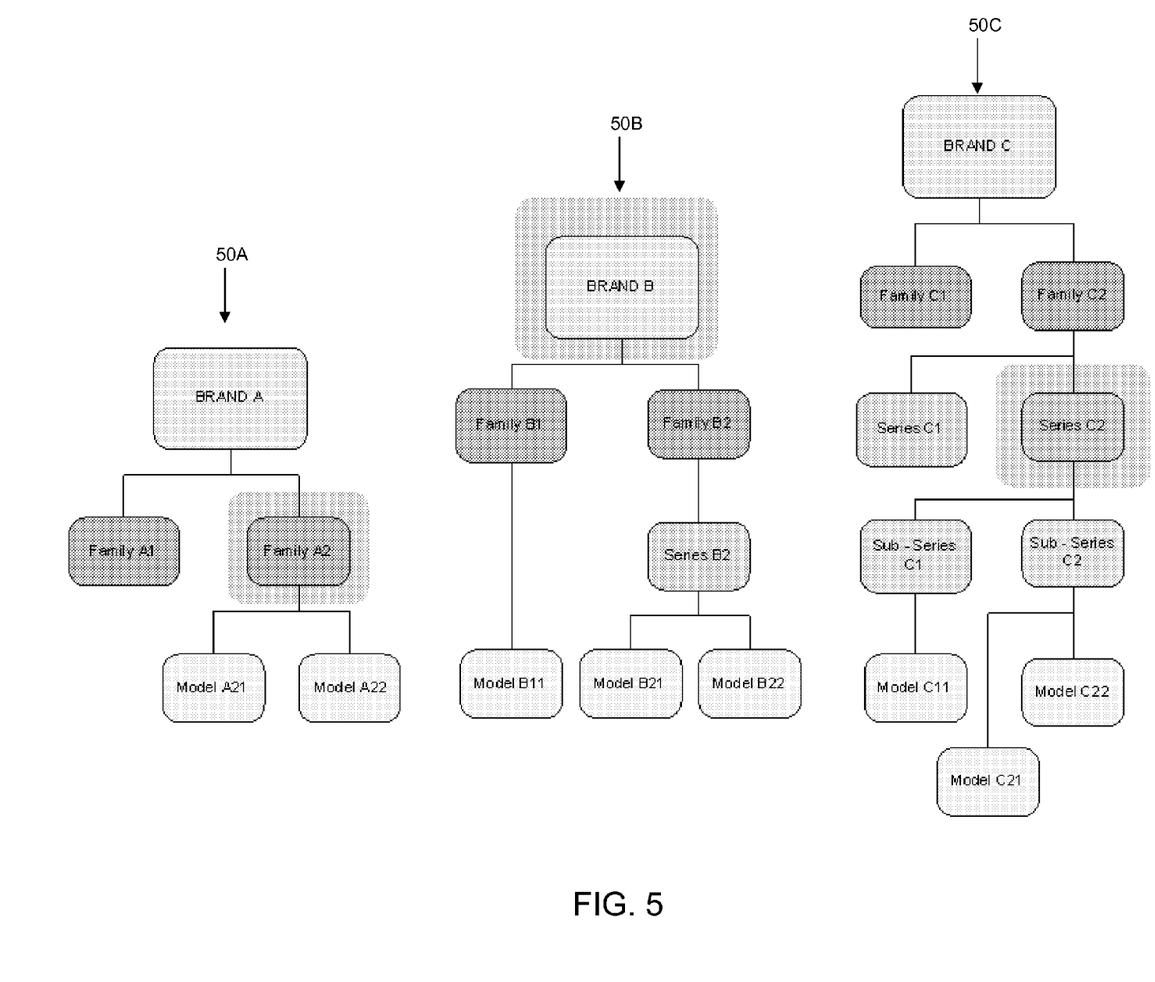
FIG. 5 depicts an illustrative context catalog according to the present invention.
Figure 6:
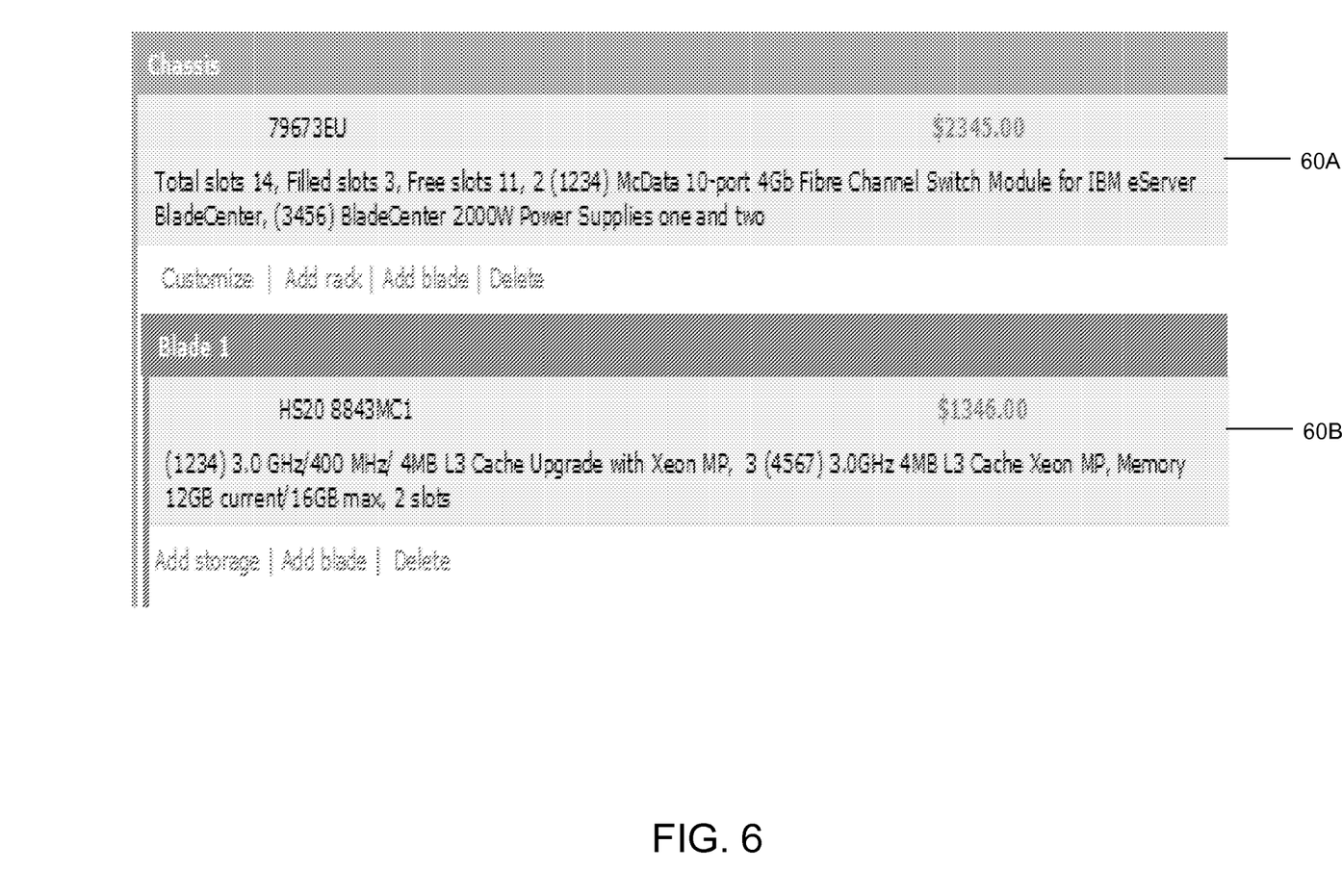
FIG. 6 depicts an illustrative builder containing two objects according to the present invention.

For example, if all the models were compatible with the user's current hierarchy, the invention would present the user with a set of selections consisting of Family A2, Brand B, and Series C2. If the user selects Brand B, their next choice is between Family B1 and Family B2. Selecting Family B1 yields a single compatible model, Model B11 and this model is added to the builder. Once the new object is loaded in the builder, the functions the builder exposes for both objects are filtered by the relationship between these two objects and the relationships of other objects to them. FIG. 6 shows the builder with two objects 60A-B. The possible actions for the initial object have changed. Add chassis is no longer a choice, since the hierarchy already contains a chassis and a blade can only be contained in one chassis. The hierarchical relationship between the chassis and the blade is conveyed in the builder. Children are added to the builder beneath the parent object. Parents are added above children. Indentation shows the nature of the relationship, and color provides a redundant cue.

From both of these objects 60A-B, the hierarchy can continue to be extended, by using the actions displayed below each object. From the chassis object, a parent rack and child blade can be added. From the blade object, additional peer blades and storage devices can be added. This illustrates a key aspect to the invention: the actions listed for each object are completely dependent on the nature of that object and the rules of the hierarchy. With each addition, the context and hence constraints on subsequent additions increase, resulting in further filtering of possible additions, and fewer exposures of add functions in the builder. It is possible that the hierarchy will reach a point when no additional objects can be added, and in that case, no add functions are displayed.

II. Computerized Implementation

Figure 7:
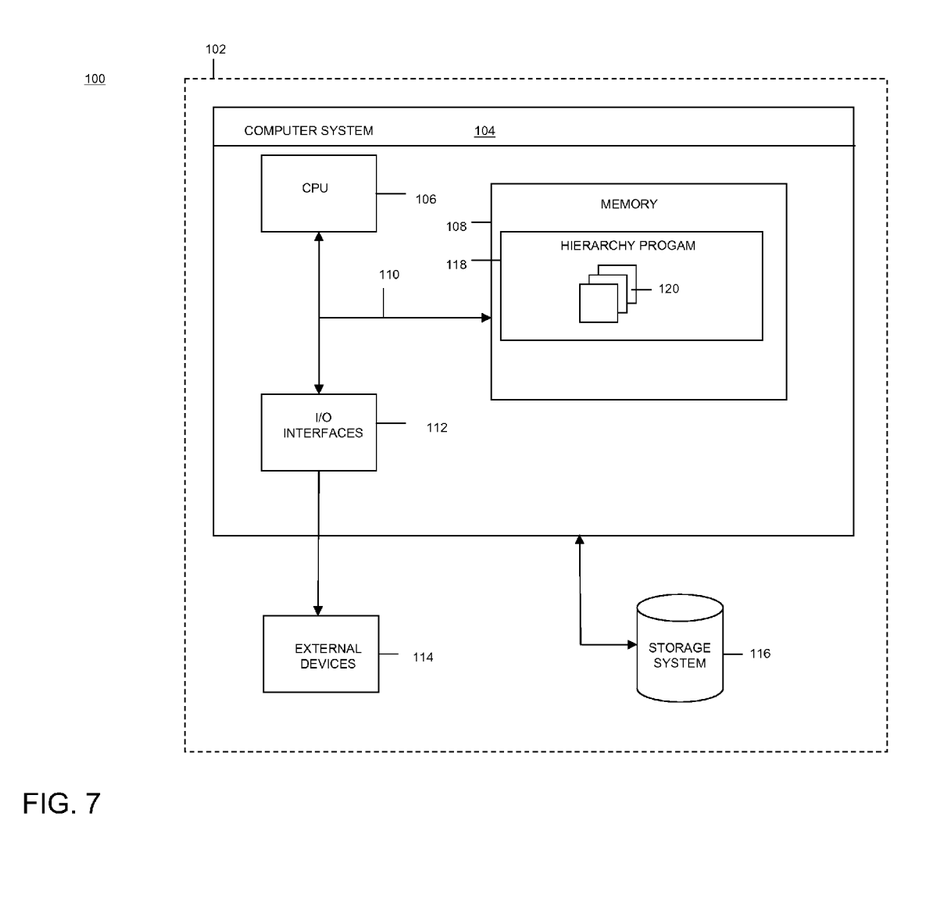
FIG. 7 depicts an illustrative computerized implementation according to the present invention.

Referring now to FIG. 7, a more detailed diagram of a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as hierarchy program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the process(es) of the invention. Moreover, computer system 104 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 7 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system(s) (e.g., databases) capable of providing storage for information under the present invention. To this extent, storage system 116 could include one or more storage devices, such as a magnetic disk drive or an optical disk drive. In another embodiment, storage system 116 include data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is hierarchy program 118, which facilitates the functions as described herein. Specifically, hierarchy program 118 includes one or more modules 120 that provide all of the interfaces and functions described herein. For example, modules 120 can include a builder that accesses a catalog, a hierarchical object map, etc. contained in storage system 116. As such, hierarchy program 118 (e.g., modules 120) can be configured to: receive a selection of a focus object; load the focus object into a builder from a catalog of objects; reveal a set of objects as possible hierarchical extensions to the focus object based on relationships of the set of objects to the focus objects (e.g., using a hierarchical object map as shown in FIG. 2); receive a selection of one of the set of objects; identify a set of instances corresponding to the selected object; and filter the set of objects for compatibility with the focus object using hierarchical relationships as defined in the catalog of objects. Further, modules 120 can filter the set of objects for compatibility with the focus objects based on a set of business rules.

While shown and described herein as a method and system for building a hierarchy, it is understood that the invention further provides various alternative embodiments. For example, in one embodiment, the invention provides a computer-readable/useable medium that includes computer program code to enable a computer infrastructure to build a hierarchy. To this extent, the computer-readable/useable medium includes program code that implements the process (es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 7) and/or storage system 116 (FIG. 7) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to build a hierarchy. In this case, the service provider can create, maintain, support, etc., a computer infrastructure, such as computer infrastructure 102 (FIG. 7) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for building a hierarchy. In this case, a computer infrastructure, such as computer infrastructure 102 (FIG. 7), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 7, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for building hierarchies, comprising:
providing a catalog of objects, the catalog of objects having a plurality of objects and hierarchical relationships between objects in the catalog of objects;
receiving a selection of a focus object from the catalog of objects, any of the catalog of objects being eligible for selection as the focus object;
loading the focus object into a builder from the catalog of objects, the focus object and the catalog of objects being computer objects used to build a computer system using a hardware configurator;
revealing a set of objects as possible hierarchical extensions to the focus object based on the hierarchical relationships of the set of objects to the focus object, the revealing including accessing a hierarchical object map that includes the focus object and revealing a set of objects that are determined to be directly connected to the focus object on the hierarchical object map;
receiving a selection of one of the set of objects, the selected object being different from the focus object;
identifying a set of instances corresponding to the selected object, the set of instances including objects that have a hierarchical relationship with the selected object; and
filtering the set of instances for compatibility with the focus object using the hierarchical relationships as defined in the catalog of objects, wherein instances resulting from the filtering have a hierarchical relationship with both the focus object and the selected object.

2. The method of claim 1, further comprising filtering the set of objects for compatibility with the focus object based on a set of business rules.

3. The method of claim 1, the set of objects being revealed based on a hierarchical relationship to the focus object.

4. The method of claim 3, the hierarchical relationship to the focus object being selected from a group consisting of a parent, a peer, and a child.

5. A system for building hierarchies, comprising:
a processor;
a module for providing a catalog of objects, the catalog of objects having a plurality of objects and hierarchical relationships between objects in the catalog of objects;
a module for receiving a selection of a focus object from the catalog of objects, any of the catalog of objects being eligible for selection as the focus object;
a module loading the focus object into a builder from the catalog of objects, the focus object and the catalog of objects being computer objects used to build a computer system using a hardware configurator;
a module revealing a set of objects as possible hierarchical extensions to the focus object based on the hierarchical relationships of the set of objects to the focus object, the revealing including accessing a hierarchical object map that includes the focus object and revealing a set of objects that are determined to be directly connected to the focus object on the hierarchical object map;
a module receiving a selection of one of the set of objects, the selected object being different from the focus object;
a module identifying a set of instances corresponding to the selected object, the set of instances including objects that have a hierarchical relationship with the selected object; and
a module filtering the set of instances for compatibility with the focus object using the hierarchical relationships as defined in the catalog of objects, wherein instances resulting from the filtering have a hierarchical relationship with both the focus object and the selected object.

6. The system of claim 5, the module for filtering being further configured to filter the set of objects for compatibility with the focus object based on a set of business rules.

7. The system of claim 5, the set of objects being revealed based on a hierarchical relationship to the focus object.

8. The system of claim 7, the hierarchical relationship to the focus object being selected from a group consisting of a parent, a peer, and a child.

9. A program product stored on a computer readable storage medium for building hierarchies, the computer readable storage medium comprising program code for causing a computer system to:
provide a catalog of objects, the catalog of objects having a plurality of objects and hierarchical relationships between objects in the catalog of objects;
receive a selection of a focus object from the catalog of objects, any of the catalog of objects being eligible for selection as the focus object;
load the focus object into a builder from the catalog of objects, the focus object and the catalog of objects being computer objects used to build a computer system using a hardware configurator;
reveal a set of objects as possible hierarchical extensions to the focus object based on the hierarchical relationships of the set of objects to the focus object, the revealing including accessing a hierarchical object map that includes the focus object and revealing a set of objects that are determined to be directly connected to the focus object on the hierarchical object map;
receive a selection of one of the set of objects, the selected object being different from the focus object;
identify a set of instances corresponding to the selected object, the set of instances including objects that have a hierarchical relationship with the selected object; and
filter the set of instances for compatibility with the focus object using the hierarchical relationships as defined in the catalog of objects, wherein instances resulting from the filtering have a hierarchical relationship with both the focus object and the selected object.

10. The program product of claim 9, the computer readable storage medium further comprising program code for causing the computer system to filter the set of objects for compatibility with the focus object based on a set of business rules.

11. The program product of claim 9, set of objects being revealed based on a hierarchical relationship to the focus object.

12. The program product of claim 11, the hierarchical relationship to the focus object being selected from a group consisting of a parent, a peer, and a child.

13. A method for deploying a system for building hierarchies, comprising:
providing a computer infrastructure that operates to:
provide a catalog of objects, the catalog of objects having a plurality of objects and hierarchical relationships between objects in the catalog of objects;
receive a selection of a focus object from the catalog of objects, any of the catalog of objects being eligible for selection as the focus object;
load the focus object into a builder from the catalog of objects, the focus object and the catalog of objects being computer objects used to build a computer system using a hardware configurator;
reveal a set of objects as possible hierarchical extensions to the focus object based on the hierarchical relationships of the set of objects to the focus object, the revealing including accessing a hierarchical object map that includes the focus object and revealing a set of objects that are determined to be directly connected to the focus object on the hierarchical object map;
receive a selection of one of the set of objects, the selected object being different from the focus object;
identify a set of instances corresponding to the selected object, the set of instances including objects that have a hierarchical relationship with the selected object; and
filter the set of instances for compatibility with the focus object using the hierarchical relationships as defined in the catalog of objects, wherein instances resulting from the filtering have a hierarchical relationship with both the focus object and the selected object.

* * * * *